US012600812B2

(12) United States Patent
Grigsby, Jr. et al.

(10) Patent No.: US 12,600,812 B2
(45) Date of Patent: Apr. 14, 2026

(54) DISPERSANTS MADE FROM ISOCYANATES AND AMINES

(71) Applicant: Huntsman Petrochemical LLC, The Woodlands, TX (US)

(72) Inventors: Robert Allison Grigsby, Jr., The Woodlands, TX (US); Xiaohua Fang, The Woodlands, TX (US); Donald Hugh Champion, The Woodlands, TX (US)

(73) Assignee: HUNTSMAN PETROCHEMICAL LLC

( * ) Notice: Subject to any disclaimer, the term of this patent is extended or adjusted under 35 U.S.C. 154(b) by 883 days.

(21) Appl. No.: 17/431,310

(22) PCT Filed: Mar. 3, 2020

(86) PCT No.: PCT/US2020/020789
§ 371 (c)(1),
(2) Date: Aug. 16, 2021

(87) PCT Pub. No.: WO2020/185450
PCT Pub. Date: Sep. 17, 2020

(65) Prior Publication Data

US 2022/0135727 A1 May 5, 2022

Related U.S. Application Data

(60) Provisional application No. 62/817,001, filed on Mar. 12, 2019.

(51) Int. Cl.
*C08G 18/10* (2006.01)
*C08G 18/28* (2006.01)
*C08G 18/50* (2006.01)
*C08K 5/00* (2006.01)
*C09B 67/46* (2006.01)

(52) U.S. Cl.
CPC ......... *C08G 18/10* (2013.01); *C08G 18/2865* (2013.01); *C08G 18/5024* (2013.01); *C08K 5/0041* (2013.01); *C09B 67/009* (2013.01); *C08G 2150/00* (2013.01)

(58) Field of Classification Search
CPC . C08G 18/10; C08G 18/2865; C08G 18/5024
See application file for complete search history.

(56) References Cited

U.S. PATENT DOCUMENTS 4,735,984 A 4/1988 Gouji et al.
5,399,294 A 3/1995 Quednau
5,910,556 A 6/1999 Wamprecht et al.
6,506,899 B1 * 1/2003 Simms ................ C09B 67/0066 528/53
8,143,364 B2 * 3/2012 Bleys ..................... C08G 18/10 252/182.29
8,283,421 B2 10/2012 Bleys et al.
8,362,300 B2 1/2013 Pritschins et al.
8,653,222 B2 2/2014 Orth et al.
2005/0004284 A1 1/2005 Koenemann et al.
2005/0250927 A1 11/2005 Pritschins et al.
2006/0009569 A1 1/2006 Charbonneau et al.
2008/0319153 A1 12/2008 Clark et al.
2012/0077950 A1 3/2012 Darragas et al.
2013/0281584 A1 * 10/2013 Woutters ................ C08G 71/02 524/113
2016/0083502 A1 3/2016 Tilak et al.

FOREIGN PATENT DOCUMENTS

EP 0198519 10/1986
EP 0976798 B1 7/2004
JP 2005538192 A 12/2005
JP 2012530162 A 11/2012
KR 2005-0044651 A 5/2005
WO 2009080465 A1 7/2009
WO 2010145913 A1 12/2010

OTHER PUBLICATIONS

International Search Report and Written Opinion received in corresponding PCT Application PCT/US2020/020789, completed Apr. 10, 2020 and mailed May 4, 2020.
Huntsman. The Jeffamine Polyetheramines, 2007, pp. 1-6 [online], [retrieved on Apr. 10, 2020]. Retrieved from the internet <URL: http://www.huntsman.com/portal/page/portal/performance_products/Media%20Library/global/files/jeffamine_polyetheramines.pdf>; p. 1, first column, third paragraph; p. 4, third paragraph.
Notice of Preliminary Rejection issued Mar. 20, 2025, in corresponding Korean Patent Application No. 10-2021-7032604 (English translation enclosed herewith).
First Office Action issued Jul. 10, 2025, in corresponding Mexican Patent Application No. MX/a/2021/010983 (English translation enclosed herewith).
Office Action issued Jul. 15, 2025, in corresponding Brazilian Patent Application No. BR 11 2021 016781 1 (English translation enclosed herewith).
Desmodur® HL BA technical data sheet (COVESTRO) Sep. 1, 2015; XP093342268.
Suprasec® 1306 technical data sheet (Huntsman) Jun. 8, 2006; XP093342246. 1306—note citing additionally as we believe the indicated TDS date for D10 relates to this, then 2085 citing PDS which we asume was intended.
Suprasec® 2085 product data sheet (Huntsman) Jan. 26, 2016.
Communication pursuant to Article 94(3) EPC (Examination Report) issued Dec. 8, 2025 in corresponding European Application No. 20769823.4.

* cited by examiner

*Primary Examiner* — Vickey Nerangis
(74) *Attorney, Agent, or Firm* — HUNTSMAN PETROCHEMICAL LLC; Aleece Hayes

(57) ABSTRACT

The present disclosure generally relates to a dispersant obtained from the reaction of a liquid isocyanate compound and a polyoxyalkylene amine and its use in dispersing various particulate solids in an aqueous or organic medium.

15 Claims, No Drawings

DISPERSANTS MADE FROM ISOCYANATES AND AMINES

CROSS-REFERENCE TO RELATED APPLICATION

This application claims the benefit of U.S. Provisional Patent Application No. 62/817,001 filed Mar. 12, 2019, the entire disclosure of which is incorporated herein by reference.

STATEMENT REGARDING FEDERALLY SPONSORED RESEARCH OR DEVELOPMENT

Not applicable.

FIELD

The present disclosure generally relates to: a dispersant obtained from the reaction of a liquid isocyanate compound and a polyoxyalkylene amine; a method for preparing the dispersant; a composition containing the dispersant, a particulate solid and an organic or aqueous medium; and a particulate solid coated with the dispersant. The present disclosure further provides compositions and coated particulate solids which may be used in connection with coatings, inks, toners, plastic materials, engine oils, concrete, detergents, gypsum wallboard, oil drilling fluids, oil spills and agricultural active ingredients.

BACKGROUND

High mechanical forces are typically needed in order to incorporate solids into an aqueous or organic medium. This force generally depends to a large extent on the wettability of the solid by the surrounding medium and on its affinity for this medium. In order to reduce dispersion forces, it is customary to employ dispersants to facilitate solids incorporation. These dispersants are primarily surface-active agents (surfactants) having an anionic, cationic or nonionic structure and can either be deposited directly on the solid or added to the liquid medium in relatively small amounts. The energy needed for solids dispersion can be significantly reduced by the use of these surfactants.

It is also known that solids can re-agglomerate after dispersion resulting in a waste of any energy previously employed in dispersing the solids. This phenomenon can be explained by London/van der Waals forces in which solids are mutually attracted to each other. In order to overcome these forces of attraction, adsorption layers have to be deposited on the solids which can be affected by the use of the above surfactants.

However, during and after dispersion of the solids by the surfactant, an interaction occurs between the surrounding medium and the solid particles, and desorption of the surfactant occurs in exchange for the surrounding medium which is present at a higher concentration. This surrounding medium is in most cases not capable of forming stable absorption layers which leads to a break down in the dispersed system. This breakdown becomes discernible, for example, by an increase in viscosity, loss of gloss and/or color strength and loss of mechanical strength in reinforced plastics.

There have been many efforts aimed at providing effective dispersants which facilitate the incorporation of solids in a liquid medium, for example:

EP Pat. No. 0198519 which discloses a dispersant formed from the reaction of (a) a symmetrical cycloaliphatic, aralaliphatic or aromatic diisocyanate and (b) a mono- or dietheramine;

U.S. Pat. No. 4,735,984 which discloses a dispersant formed from the reaction of (a) a polyisocyanate and (b) an amine having two or more primary and/or secondary amino groups;

U.S. Pat. No. 5,399,294 which discloses a dispersant comprising the reaction product of (a) a polyisocyanate having an ave. functionality of 2.0 to 5 (b) a mixture of a monohydroxy compound and a monoamino-, monocarboxylic acid compound and (c) a compound containing one basic nitrogen and an isocyanate reactive group;

U.S. Pat. No. 5,910,556 which discloses a dispersant formed from the reaction of (a) a polyisocyanate having an average functionality of 1.7-2.5 and one or more of (b) a monohydric polyether alcohol, (c) a monohydric alcohol, (d) an amine having a molecular weight of 88-260 and which contains at least one tertiary amine and (e) a compound having a number average molecular weight of 32-5000 and which contains at least two isocyanate-reactive groups;

U.S. Pat. No. 8,653,222 which discloses a dispersant formed from the reaction of (a) a polyepoxide and (b) an aliphatic or aralaliphatic primary amine followed by subsequent reaction with a modified isocyanate; and U.S. Pat. Appl. Publ. No. 2016/0083502 which discloses a dispersant formed from the reaction of (a) a polyisocyanate, (b) a compound having a polyether chain and an amino group and (c) at least one of N-(3-aminopropyl)imidazole, benzoguanamine or N-(2-aminoethyl) piperazine.

While state of the art dispersants may be suitable for particular applications, a need exists for the development of alternative dispersants that are capable of dispersing a variety of solids in variety of liquid mediums to form compositions having at least similar, if not improved, physical and chemical properties as compared to those for conventional compositions which contain such state of the art dispersants.

SUMMARY

The present disclosure generally provides a dispersant substantially free of biuret groups and obtained from the reaction of a liquid isocyanate compound substantially free of an isocyanate prepolymer and a polyoxyalkylene amine.

In another embodiment, there is provided a composition including the dispersant of the present disclosure, a particulate solid and an aqueous or organic medium.

In still another embodiment, there is provided a method for dispersing a particulate solid in an aqueous or organic medium comprising contacting the particulate solid with the dispersant of the present disclosure.

DETAILED DESCRIPTION

The present disclosure is generally directed to a dispersant substantially free of biuret groups and obtained from the reaction of (i) a liquid isocyanate compound substantially free of an isocyanate prepolymer and (ii) a polyoxyalkylene amine selected from the group consisting of a polyoxyalkylene monoamine, a polyoxyalkylene diamine, a polyoxyalkylene triamine and a mixture thereof. It has been surprisingly found that the dispersants of the present disclosure may be capable of at least: improving the color strength and/or other tinctorial properties of a pigment-containing composition; increasing a particulate solid load in a composition; forming dispersions having improved brightness and/or dispersion stability; and/or, producing a composition having a reduced viscosity and stability under ambient storage conditions and/or high temperature storage conditions.

The following terms shall have the following meanings:

The term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, except those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical objects of the article. By way of example, "an amine" means one amine or more than one amine. The phrases "in one embodiment", "according to one embodiment" and the like generally mean the particular feature, structure, or characteristic following the phrase is included in at least one embodiment of the present disclosure, and may be included in more than one embodiment of the present disclosure. Importantly, such phrases do not necessarily refer to the same aspect. If the specification states a component or feature "may", "can", "could", or "might" be included or have a characteristic, that particular component or feature is not required to be included or have the characteristic.

The term "about" as used herein can allow for a degree of variability in a value or range, for example, it may be within 10%, within 5%, or within 1% of a stated value or of a stated limit of a range.

Values expressed in a range format should be interpreted in a flexible manner to include not only the numerical values explicitly recited as the limits of the range, but to also include all of the individual numerical values or sub-ranges encompassed within that range as if each numerical value and sub-range is explicitly recited. For example, a range such as from 1 to 6, should be considered to have specifically disclosed sub-ranges, such as, from 1 to 3, from 2 to 4, from 3 to 6, etc., as well as individual numbers within that range, for example, 1, 2, 3, 4, 5, and 6. This applies regardless of the breadth of the range.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The term "substantially free" refers to a composition or compound in which a particular compound or moiety is present in an amount that has no material effect on the composition or compound. In some embodiments, "substantially free" may refer to a composition or compound in which the particular compound or moiety is present in the composition or compound in an amount of less than 2% by wt., or less than 1% by wt., or less than 0.5% by wt., or less than 0.1% by wt., or less than 0.05% by wt., or even less than 0.01% by wt. based on the total weight of the composition or compound, or that no amount of that particular compound or moiety is present in the respective composition or compound.

Where substituent groups are specified by their conventional chemical formula, written from left to right, they equally encompass the chemically identical substituents that would result from writing the structure from right to left, for example, $—CH_2O—$ is equivalent to $—OCH_2—$.

The term "aqueous medium" as used herein refers to a liquid medium composed largely, but not necessarily exclusively, of water, such as at least 50% by weight of water, or at least 60% by weight of water, or at least 70% by weight of water, or at least 80% by weight of water, or at least 90% by weight of water or at least 95% by weight of water. Other components may be present, such as salts, co-solvents, buffers, etc.

The term "organic medium" refers to a liquid medium composed largely, but not exclusively, of one or more organic solvents, such as at least 50% by weight of an organic solvent, or at least 60% by weight of organic solvent, or at least 70% by weight of water, or at least 80% by weight of organic solvent, or at least 90% by weight of organic solvent or at least 95% by weight of organic solvent. Other components may be present, such as water, buffers, etc.

The term "aliphatic" refers to organic compounds characterized by substituted or unsubstituted straight, branched, and/or cyclic chain arrangements of constituent carbon atoms. Aliphatic compounds do not contain aromatic rings as part of the molecular structure of the compounds. As used herein, the term "cycloaliphatic" refers to organic compounds characterized by arrangement of carbon atoms in closed ring structures. Cycloaliphatic compounds do not contain aromatic rings as part of the molecular structure of the compounds. Hence, cycloaliphatic compounds are a subset of aliphatic compounds.

The term "optional" or "optionally" means that the subsequently described event or circumstance may or may not occur, and that the description includes instances where said event or circumstance occurs and instances where it does not.

According to one embodiment, the dispersant may be obtained from the reaction of a liquid isocyanate compound and a polyoxyalkylene amine. The liquid isocyanate compound may be a monoisocyanate compound, a polyisocyanate compound or a mixture thereof. The term "monoisocyanate compound" is meant to denote isocyanate compounds having one isocyanate group. The term "polyisocyanate compound" is meant to denote an isocyanate compound having two or more reactive isocyanate groups in a single molecule, such as a diisocyanate, a triisocyanate, a tetraisocyanate, etc.

According to one embodiment, the isocyanate compound is a monoisocyanate compound. In another embodiment, the monoisocyanate compound is an aliphatic monoisocyanate compound, an aromatic monoisocyanate compound or a mixture thereof.

Examples of monoisocyanate compounds include, but are not limited to, methyl isocyanate, ethyl isocyanate, n-propyl isocyanate, isopropyl isocyanate, n-butyl isocyanate, isobutyl isocyanate, tert-butyl isocyanate, n-pentyl isocyanate, n-hexyl isocyanate, cyclohexyl isocyanate, w-chlorohexamethylene isocyanate, n-heptyl isocyanate, n-octyl isocyanate, iso-octyl isocyanate, 2-ethyl hexyl isocyanate, 2-norbornyl methyl isocyanate, nonyl isocyanate, 2,3,4-trimethylcyclohexyl isocyanate, 3,3,5-trimethylcyclohexyl isocyanate, decyl isocyanate, undecyl isocyanate, dodecyl isocyanate, tridecyl isocyanate, tetradecyl isocyanate, pentadecyl isocyanate, hexadecyl isocyanate, octadecyl isocyanate, stearyl isocyanate, 3-butoxypropyl isocyanate, 3-(2-ethylhexyloxy)-propyl isocyanate, 6-chlorohexyl isocyanate benzyl isocyanate, phenyl isocyanate, ortho-, meta-, para-tolyl isocyanate, dimethylphenyl isocyanate (technical mixture and individual isomers), 4-pentylphenyl isocyanate, 4-cyclohexylphenyl isocyanate, 4-dodecylphenyl isocyanate, ortho-, meta-, para-methoxyphenyl isocyanate, chlorophenyl isocyanate (2,3,4-isomers), the different dichlorophenyl isocyanate isomers, 4-nitrophenyl isocyanate, 3-trifluoromethylphenyl isocyanate, 1-naphthyl isocyanate and mixtures thereof.

According to another embodiment, the isocyanate compound is a polyisocyanate compound having the general formula $R_a$—$(NCO)_z$ where $R_a$ is an aliphatic or aromatic group and z is an integer of at least 2. Thus, the polyisocyanate compound may be an aliphatic polyisocyanate compound, an aromatic polyisocyanate compound or a mixture thereof.

Non-limiting examples of polyisocyanate compounds include hexamethylene diisocyanate, octamethylene diisocyanate, 2,2'-, 2,4'- and 4,4'-diphenylmethane diisocyanate, pure or in isomeric mixtures (for e.g. a mixture containing 4,4'-MDI and up to 60% by weight 2,2'-MDI and 2,4'-MDI), polymeric methylene diphenyl diisocyanate, meta- and para-phenylene diisocyanate, tolylene-2,4- and tolylene-2,6-diisocyanate (also known as toluene diisocyanate), chlorophenylene-2,4-diisocyanate, naphthylene-1,5-diisocyanate, diphenylene-4,4'-diisocyanate, 4,4'-diisocyanate-3,3'-dimethyl-diphenyl, 3-methyl-diphenylmethane-4,4'-diisocyanate and diphenyl ether diisocyanate, cyclohexane-2,4- and -2,3-diisocyanate, 1-methyl cyclohexyl-2,4- and -2,6-diisocyanate, bis-(isocyanatocyclohexyl)methane (for e.g. 4,4'-diisocyanatodicyclohexylmethane (H12MDI)), 2,4,6-triisocyanatotoluene and 2,4,4-triisocyanatodiphenylether, isophorone diisocyanate (IPDI), butylene diisocyanate, trimethylhexamethylene diisocyanate, isocyanatomethyl-1,8-octane diisocyanate, tetramethylxylene diisocyanate (TMXDI), 1,4-cyclohexanediisocyanate (CDI), tolidine diisocyanate (TODI) and any combination thereof.

According to another embodiment, the isocyanate compound may be a polyisocyanate compound comprising a functional group selected from the group consisting of an isocyanurate, an iminooxadiazine, a uretdione, an allophante and a combination thereof.

Isocyanurates may be prepared by the cyclic trimerization of a polyisocyanate compound. Trimerization may be performed, for example, by reacting three equivalents of a polyisocyanate compound to produce one equivalent of isocyanurate ring. The three equivalents of polyisocyanate may comprise three equivalents of the same polyisocyanate compound, or various mixtures of two or three different polyisocyanate compounds. Compounds, such as, for example, phosphines, Mannich bases and tertiary amines, such as, for example, 1,4-diaza-bicyclo2.2.2]octane, dialkyl piperazines, and the like, may be used as trimerization catalysts. Iminooxadiazines may be prepared by the asymmetric cyclic trimerization of a polyisocyanate compound. Uretdiones may be prepared by the dimerization of a polyisocyanate compound under heat and optionally in the presence of a catalyst. Allophanates may be prepared by the reaction of a polyisocyanate compound with a urethane.

Polyisocyanate compounds that may find utility in the production of such isocyanurate-, iminooxadiazine-, uretidione- and allophanate-modified isocyanates may include the polyisocyanate compounds described above. In some embodiments the polyisocyanate compound may be ethylene diisocyanate, 1,4-tetramethylene diisocyanate; 1,6-hexamethylene diisocyanate (HDI), octamethylene diisocyanate, decamethylene diisocyanate, 2,2,4-trimethyl-1,6-hexamethylene diisocyanate, 1,12-dodecamethylene diisocyanate, cyclohexane-1,4-diisocyanate, 1 socyanato-3-isocyanatomethyl-3,5,5-trimethyl-cyclohexane (isophorone diisocyanate or IPDI), bis-(4-isocyanatocyclohexyl)methane (HMDI), bis-(4-isocyanato-3-methyl-cyclohexyl)methane, benzene diisocyanate, 1,3-phenylene diisocyanate (m-phenylene diisocyanate), 1,4-phenylene diisocyanate (p-phenylene diisocyanate), 4,4'-methylenediphenyl diisocyanate (4,4-MDI), 2,4'-methylenediphenyl diisocyanate (2,4-MDI), 2,2'-diisocyanatodiphenylmethane (2,2-MDI), 2,4-toluene diisocyanate, 2,6-toluene diisocyanate, hexahydrotoluene diisocyanate (and isomers), hydrogenated methylene bis(phenylisocyanate), 1,5-naphthalene diisocyanate, 1-methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate (tolidine diisocyanate), 1-[(2,4-diisocyanatophenyl)methyl]-3 socyanato-2-methyl, 2,4,6-triisopropyl-m-phenylene diisocyanate, bis (4,4'-isocyanato-cyclohexyl)methane (H12MDI), 1,3- and 1,4-bis-(2-isocyanato-prop-2-yl)-benzene (TMXDI), 4,4', 4"-triphenylmethane triisocyanate, toluene 2,4,6-triisocyanate, 4,4'-dimethyldiphenylmethane-2,2',5,5'-tetraisocyanate, polymethylene polyphenylene polyisocyanate, and any combinations thereof.

In one particular embodiment, the isocyanate compound is a polyisocyanate compound comprising a uretidione group. Representative starting polyisocyanate compounds may include those polyisocyanate compounds described above. In one particular embodiment, the starting polyisocyanate compound may be 2,4-TDI, 2,6-TDI, 4,4-MDI, 2,4-MDI, 2,2-MDI, 4,4'-methylenebis(cyclohexyl isocyanate), 2,4'-methylenebis(cyclohexyl isocyanate), 2,2'-methylenebis(cyclohexyl isocyanate), polymethylene polyphenyl polyisocyanate, α,α'-xylylene diisocyanate, β,β'-diethylbenzene diisocyanate, 4,4',4"-triphenylmethylene triisocyanate, o-tolidine diisocyanate, hexamethylene diisocyanate, octamethylene diisocyanate, decamethylene diisocyanate and any combination thereof. In one particular embodiment, the polyisocyanate compound is an aliphatic polyisocyanate compound. In still another particular embodiment, the polyisocyanate compound may be 4,4-MDI and/or 2,4-MDI and/or 2,2-MDI and mixtures which preferably have a 4,4-MDI content of at least 45% by weight, or at least about 50% by weight, or at least 60% by weight, or at least 70% by weight, or at least 80% by weight, or at least 90% by weight to about 100% by weight. Examples of polyisocyanate compounds comprising uretdione group(s) include, without limitation, those marketed and sold by Huntsman International LLC under the trademark RUBINATE® (for e.g. RUBINATE® 1680 and 9225 isocyanates), as well as analogous polyisocyanate compounds offered by other companies comprising uretdione group(s).

The polyoxyalkylene amine which is reacted with the isocyanate compound to form the dispersant of the present disclosure may be a polyoxyalkylene monoamine, a polyoxyalkylene diamine, a polyoxyalkylene triamine and any combination thereof. These compounds are defined by an amino group attached to a terminus of a polyether backbone and, thus, are considered polyether amines. The amino group may be a primary (—$NH_2$) or secondary (—NH—) amino group. In one preferred embodiment, the amino group is a primary amino group. Depending on whether the polyoxyalkylene amine is a mono-, di-, or triamine, each compound can contain, respectively, one, two, or three amino groups with each group being attached to the terminus of a polyether backbone. Accordingly, one or more polyether backbones may be necessary to accommodate the number of terminal amino groups. As further discussed below, the polyether backbone(s) is based on, i.e., further defined by, alkylene oxide groups, such as propylene oxide (PO), ethylene oxide (EO), butylene oxide (BO) and mixtures thereof. In mixed structures, the ratios can be in any desired ratio and may be arranged in blocks (for e.g. repeating or alternating) or randomly distributed. In one non-limiting example, in a mixed EO/PO structure, the ratio of EO:PO can range from about 1:1 to about 1:50 and vice-versa. As such, the polyoxyalkylene amine may substantially define a polyethylene oxide, polypropylene oxide, and/or a polybutylene oxide. The molecular weights of the polyoxyalkylene amines can vary and may range up to a molecular weight of about 6,000.

Additionally, when the dispersant of the present disclosure is prepared for use in highly polar systems, such as aqueous media, the polyoxyalkylene amine that is used in forming the dispersant can include a sufficiently high fraction (e.g. a higher amount) of polar groups (i.e. polyethylene oxides) than apolar groups (i.e. polypropylene and/or butylene oxides) in order to achieve a level of water solubility sufficient for the particular area of use. For example, the polyoxyalkylene amine may contain greater than 50% by weight, or greater than 60% by weight, or greater than 75% by weight or greater than 90% by weight ethylene oxide. Similarly, in the case of forming dispersants for use in non-polar systems, the polyoxyalkylene amine can include a sufficiently high fraction (e.g. a higher amount) of apolar groups than polar groups, such as greater than 50% by weight or greater than 60% by weight or greater than 75% by weight or greater than 90% by weight of propylene oxide and/or butylene oxide. In the case of forming dispersants for use in systems where broad compatibility is important, the polyoxyalkylene amine can include a balanced combination of such polar and apolar groups.

In one embodiment, the polyoxyalkylene amine is a polyoxyalkylene monoamine. The polyoxyalkylene monoamine may generally be prepared by reaction of a monohydric initiator, for e.g. an alcohol, with ethylene and/or propylene oxide and/or butylene oxide. This reaction is followed by conversion of the resulting terminal hydroxyl group to an amine, thereby providing a polyether backbone which includes propylene oxide (PO), ethylene oxide (EO), butylene oxide (BO) or mixtures thereof, and a terminal amino group, for e.g., a terminal primary amino group or secondary amino group, preferably a primary amino group.

According to one particular embodiment, the polyoxyalkylene monoamine is a compound having a formula:

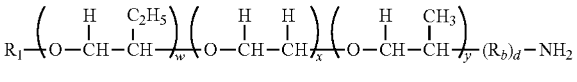

where $R_1$ is hydrogen, a $C_1$ to $C_{20}$ alkyl group or a $C_6$ aryl group optionally substituted with one or more $C_1$ to $C_{10}$ alkyl groups; w, x, and y are each independently an integer zero to about 100, subject to the proviso that w+x+y is greater than two; d is 0 or 1; and, $R_b$ is a $C_1$ to $C_{10}$ alkyl group. In some embodiments, w, x and y may be an integer zero to about 50, or zero to about 20, or zero to about 10, subject to the proviso that w+x+y is greater than two.

The above structure may include homopolymers and co-polymers of any one or more of the following, either alone or mixed with one another in any proportion: ethylene oxide, propylene oxide, and butylene oxide. According to one aspect, the molecular weight of the polyoxyalkylene monoamine may be any molecular weight between about 500 and about 6000. In another particular embodiment, the polyoxyalkylene monoamine may have a molecular weight between about 600 and about 3000. In still another particular embodiment, the polyoxyalkylene monoamine may have a molecular weight of at least 1000, or at least 2000, or at least 3000, or at least 4000 or even at least 5000.

Examples of polyoxyalkylene monoamines of the above structure include, without limitation, those available from Huntsman Petrochemical LLC under the trademarks JEFFAMINE® amines and SURFONAMINE® amines, as well as analogous compounds offered by other companies comprising polyoxyalkylene primary monoamines. Examples include the SURFONAMINE® B- and L-series amines which have the general structure:

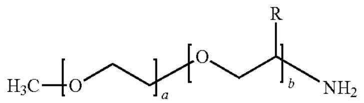

where R is methyl and a and b are integers such that the mole ratio of PO/EO in the compound ranges from about 9/1 to about 1/11. Thus, in some embodiments, R is methyl and the mole ratio of PO/EO ranges from about 9/1 to about 1/1 or from about 9/1 to about 4.5/1. In another embodiment, R is methyl and the mole ratio of PO/EO ranges from about 1/1 to about 1/11 or from about 1/3.3 to about 1/11 or from about 1/6.3 to about 1/11 or even from about 1/7 to about 1/11. As noted above, the PO and EO units may be arranged in block form (for e.g. repeating or alternating) or randomly distributed. While these compounds are methoxy terminated, the polyoxyalkylene monoamine can also be capped with other groups where the methyl group of the methoxy group is replaced with a higher hydrocarbon such as ethyl, propyl, butyl, phenyl, or benzyl.

According to another embodiment, the polyoxyalkylene amine is a polyoxyalkylene diamine. Procedures for making polyoxyalkylene diamines are described in, for example, U.S. Pat. No. 3,654,370, the contents of which are incorporated herein by reference.

In one embodiment, the polyoxyalkylene diamine is an amine terminated polyoxyalkylene diol. The polyether backbone for such polyoxyalkylene diols can include ethylene oxide, propylene oxide, butylene oxide or mixtures thereof and thus the polyoxyalkylene primary diamine may have a general formula

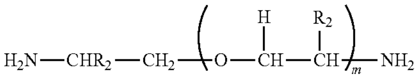

where m is an integer of 2 to about 100 and each $R_2$ is independently hydrogen, methyl or ethyl. In some embodiments, each $R_2$ is independently hydrogen or methyl and m is an integer of 2 to about 70, or 2 to about 35 or 2 to about 7. In other embodiments, each $R_2$ is independently hydrogen or methyl and m is an integer of 6 to about 70 or about 6 to about 35. In still further embodiments, each $R_2$ is methyl and m is an integer of 2 to about 70. Examples of these compounds include the JEFFAMINE® D-series amines available from Huntsman Petrochemical LLC, as well analogous compounds offered by other companies comprising polyoxyalkylene primary diamines.

In another embodiment, the polyoxyalkylene diamine has a general formula

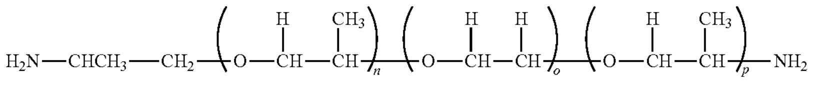

where n and p are each independently integers from about 1 to about 10 and o is an integer from about 2 to about 40. In some embodiments, o is an integer of about 2 to about 40, or about 2 to about 13 or about 2 to about 10. In another embodiment, o is an integer of about 9 to about 40, or about 12 to about 40 or about 15 to about 40, or even about 25 to about 40. In other embodiments, n+p is an integer within a range of about 1 to about 6, or within a range of about 1 to about 4 or within a range of about 1 to about 3. In further embodiments, n+p is an integer within a range of about 2 to about 6 or within a range of about 3 to about 6. Examples of these compounds include the JEFFAMINE® ED-series amines available from Huntsman Petrochemical LLC, as well analogous compounds offered by other companies comprising polyoxyalkylene primary diamines.

In still another embodiment, the polyoxyalkylene diamine may have the formula

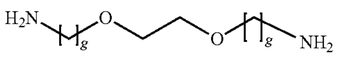

where g is an integer from about 2 to about 3. Examples of these compounds include the JEFFAMINE® EDR-series amines available from Huntsman Petrochemical LLC, as well analogous compounds offered by other companies comprising polyoxyalkylene primary diamines.

In still another embodiment, the polyoxyalkylene amine is a polyoxyalkylene triamine. The polyoxyalkylene triamine similarly can be ethylene oxide, propylene oxide or butylene oxide based, as well as mixtures thereof, and may be prepared by the reaction of such oxides with a triol initiator (for e.g. glycerin or trimethylolpropane), followed by amination of the terminal hydroxyl groups. In one embodiment the polyoxyalkylene triamine may have a general formula

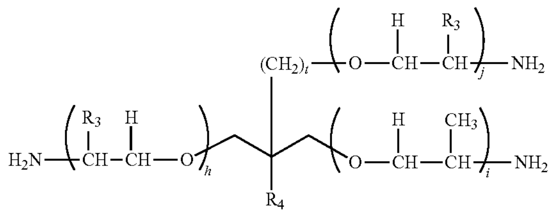

where each $R_3$ is independently hydrogen, methyl or ethyl, $R_4$ is hydrogen, methyl or ethyl, t is 0 or 1 and h, i and j independently are integers from about 1 to about 100. In one embodiment, $R_4$ is hydrogen or ethyl. In another embodiment, each $R_3$ is independently hydrogen or methyl, and in some embodiments each $R_3$ is methyl. In still another embodiment, h+i+j is an integer within a range of about 1 to about 100 or within a range of about 5 to about 85. Examples of these compounds include the JEFFAMINE® T-series amines available from Huntsman Petrochemical LLC, as well analogous compounds offered by other companies comprising polyoxyalkylene primary triamines.

The dispersant of the present disclosure can be obtained by contacting the polyoxyalkylene amine and the liquid isocyanate compound and allowing them to react until all of the isocyanate groups have been completely reacted and the NCO content for the product is zero or negligible. In the reaction, either the amount of polyoxyalkylene amine or the amount of isocyanate compound may be used in excess relative to the stoichiometric amount, or the amounts of polyoxyalkylene amine and isocyanate compound may be used in equal stoichiometric amounts. For example, the ratio of the number of amino groups from the polyoxyalkylene amine to the number of isocyanate groups from the isocyanate compound may be within a range of about 0.7 to 1.5, or within a range of about 0.8 to about 1.2, or within a range of about 0.9 to about 1.1 or even within a range of about 0.95 to about 1.05 or even still within a range of about 0.98 to about 1.02. Although the reaction preferably takes place in the absence of a solvent, in some embodiments the reaction may be carried out in the presence of a solvent. If present, the solvent should be substantially free of functional groups capable of reacting with the isocyanate groups of the isocyanate compound. Examples of such solvents, include, but are not limited to, ketones, such as methyl ethyl ketone, methyl propyl ketone and acetone, esters, such as butyl acetate and pentyl propionate, ethers, such as diethylene glycol dimethyl ether, dioxane, tetrahydrofuran N-methyl pyrrolidone, ketoesters, aromatic hydrocarbons alkanes, cyclic alkanes and mixtures thereof. The solvent may be removed during or after completion of the reaction by known methods, for example, by distillation.

Because the polyoxyalkylene amines are very reactive with isocyanate compounds, no heat and/or no catalyst is required (or in preferred embodiments is used) to carry out the reaction between the polyoxyalkylene amine and isocyanate compound. Accordingly, the reaction can take place at ambient temperature (although in some embodiments the reaction may be conducted at a temperature of between ambient temperature and 100° C.) and/or in the absence of a catalyst. This is advantageous since catalysts necessary to prepare conventional dispersants are difficult to remove once the reaction is complete and may cause the reaction product that is formed to decompose over time. Therefore, the ability to avoid the presence of such catalysts in reaction mixtures for producing the dispersant according to the present disclosure results in more stable dispersions containing the dispersant of the present disclosure.

In addition, because the reaction between the polyoxyalkylene amine and isocyanate compound can take place quickly, it may be necessary to provide methods of mixing which will encourage uniform mixing at a rate as fast as or faster than the reaction is taking place to promote uniform mixing and uniform reactions throughout the mixture. If a vessel is used to provide mixing with a moving or static mechanical stirrer, the stirring should be at such a rate to provide this uniform and fast mixing so that the reaction will be homogeneous throughout the mixture. The stirring may also be done by other means known to those skilled in the art, such as impingement mixing. In impingement mixing two or more streams are impacted at a high velocity and the resulting turbulence can provide intimate mixing very rapidly. Impingement mixing is known to those skilled in the art and, as is known to those in the reaction injection molding area since the head of a RIM machine relies on impingement mixing to mix reactants together. In one embodiment, the dispersant formed from the polyoxyalkylene amine and an isocyanate compound could be made by mixing the reactants through the head of an RIM machine or similar device, and then instead of injecting this material into a mold which is done in the normal RIM process, the mixture can be directed to a container for later use. Depending on the type of polyoxyalkylene amine and the type of isocyanate compound, the degree of speed of mixing necessary to provide a uniform homogeneous reaction will vary. For example, in the case of a typical aliphatic isocyanate compound reacted with a polyoxyalkylene amine, the reaction rate, although fast, might be slow enough to allow mechanical mixing means such as stirrers to be used, if desired. However, where the reaction takes place at a very rapid rate, normal mixing means such as stirrers may not be practical since they cannot mix the two components rapidly enough to avoid non-homogeneous reaction phases in the final product. In this case, the impingement mixing technique or a mixing technique known to those skilled in the art, which is at least as rapid and thorough as impingement mixing, can be used to ensure proper rapid mixing.

According to another embodiment, the dispersant of the present disclosure may be used to disperse a first liquid in a second liquid and/or to disperse a particulate solid in a liquid. Accordingly, there is provided a method for dispersing a first liquid in a second liquid comprising contacting the first liquid and second liquid with an effective amount of the dispersant of the present disclosure.

In another embodiment, there is provided a method for dispersing a particulate solid in an aqueous or organic medium comprising contacting the particulate solid with an effective amount of the dispersant of the present disclosure. The amount of dispersant used may be an amount of about 0.1% by weight to about 100% by weight, or from about 0.5% by weight to about 40% by weight, or even from about 1% by weight to about 15% by weight, based on the total weight the particulate solids to be dispersed. The dispersant may either be pre-mixed with the particulate solids to be dispersed or dissolved directly in the aqueous or organic medium before or simultaneously with the addition of the particulate solids (e.g. pigments, fillers).

In yet another embodiment there is provided a composition comprising a particulate solid, the dispersant according to the present disclosure and an organic medium. In some embodiments, the organic medium is a non-polar organic medium or a polar organic medium.

The non-polar organic medium may be mineral oil, an aliphatic or aromatic hydrocarbon, a plastic material (e.g. thermoplastic or thermoset resin), a plasticizer or mixtures thereof. Particular examples may include, but are not limited to, non-halogenated aromatic hydrocarbons (e.g. toluene and xylene), halogenated aromatic hydrocarbons (e.g. chlorobenzene, dichlorobenzene, chlorotoluene), non-halogenated aliphatic hydrocarbons (e.g. linear and branched aliphatic hydrocarbons containing six or more carbon atoms both fully and partially saturated) and halogenated aliphatic hydrocarbons (e.g. dichloromethane, carbon tetrachloride, chloroform, trichloroethane). The non-polar organic medium may also include natural non-polar organics (e.g. vegetable oil, sunflower oil, rapeseed oil, linseed oil, terpenes and glycerides).

The polar organic medium may include an amine, an ether, especially lower alkyl ethers, an organic acid, an ester, a ketone, a glycol, a glycol ether, a glycol ester, an alkanol, an amide and any mixture thereof. Particular examples may include, but are not limited to, acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxypropyl acetate, ethyl butyrate, ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate, methanol, ethanol, n-propanol, isopropanol, n-butanol and isobutanol (also known as 2-methylpropanol), terpineol, diethyl ether and tetrahydrofuran.

According to another embodiment, there is provided a composition comprising a particulate solid, the dispersant according to the present disclosure, an organic medium and a binder. In some embodiments, the binder may be a nitrocellulose resin, polyepoxide resin, polyurethane resin, alkyd resin, polyacrylate resin, polyester resin, polyvinyl resin, polyamide resin as well as other synthetic and natural resins.

According to still yet another embodiment there is provided a composition comprising a particulate solid, the dispersant according to the present disclosure and an aqueous medium. In another embodiment, the composition may further include a binder, such as those described above.

In yet another embodiment there is provided a composition comprising a particulate solid and a coating disposed on the particulate solid, the coating comprising the dispersant of the present disclosure. As used herein, "disposed on" encompasses "disposed about" the particulate solid and also covers both partial and complete covering of the particulate solid by the coating. The amount of the dispersant disposed onto the particulate solid depends upon the specific application of the particulate solid, but may in some embodiments be disposed on the particulate solid in an amount from about 0.001% by weight to about 50% by weight, or from about 0.01% by weight to about 40% by weight or from about 0.1% by weight to about 30% by weight, based on 100 parts by weight of the particulate solid. The coated particulate solid may formed by contacting the particulate solid with the dispersant by known techniques including, but are not limited to, mixing, pan coating, fluidized-bed coating, co-extrusion, spraying, in-situ formation of the coating, and spinning disk encapsulation.

The particulate solid in the above embodiments may be any inorganic or organic solid material which is substantially insoluble in the organic medium and/or insoluble in the aqueous medium at the temperature concerned and which it is desired to stabilize in a finely divided form therein. The particulate solid may be in the form of a granular material, a fibre, a platelet or in the form of a powder, often a blown powder.

In some embodiments, the particulate solid may have an average particle size measured by light scattering measurements of from 10 nanometers to 10 microns, or 10 nanometers to 1, 2, 3, or 5 microns, or 20 nanometers to 1, 2, 3, or 5 microns in diameter Examples of particular particulate solids include, but are not limited to, pigments; extenders; fillers; blowing agents; flame retardants for paints and plastic materials; dyes, especially disperse dyes; optical brightening agents and textile auxiliaries; pigments for inks and toners; solids for oil-based and inverse-emulsion drilling muds; dirt and solid particles in dry cleaning fluids; metals; particulate ceramic materials and magnetic materials for ceramics, piezoceramic printing, refactories, abrasives, capacitors, fuel cells, ferrofluids, conductive inks, magnetic recording media, water treatment and hydrocarbon soil remediation; organic and inorganic nanodisperse solids; metal, metal oxides and carbon for electrodes in batteries; fibres such as wood, paper, glass, steel, carbon and boron for composite materials; and, biocides, agrochemicals and pharmaceuticals which are applied as dispersions in organic and/or aqueous media.

In one embodiment, the particulate solid is an organic pigment. Examples of organic pigments include, but are not limited to, those from the azo, disazo, trisazo, condensed azo, azo lakes, naphthol pigments, anthanthrone, anthrapyrimidine, anthraquinone, benzimidazolone, carbazole, diketopyrrolopyrrole, flavanthrone, indigoid pigments, indanthrone, isodibenzanthrone, isoindanthrone, isoindolinone, isoindoline, isoviolanthrone, metal complex pigments, oxazine, perylene, perinone, pyranthrone, pyrazoloquinazolone, quinacridone, quinophthalone, thioindigo, triarylcarbonium pigments, triphendioxazine, xanthene and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones, diketopyrrolopyrroles, perylenes and carbon black.

According to another embodiment, the particulate solid is an inorganic pigment. Examples of inorganic pigments include, but are not limited to, metallic oxides such as titanium dioxide, rutile titanium dioxide and surface coated titanium dioxide, titanium oxides of different colors such as yellow and black, iron oxides of different colors such as yellow, red, brown and black, zinc oxide, zirconium oxides, aluminium oxide, oxymetallic compounds such as bismuth vanadate, cobalt aluminate, cobalt stannate, cobalt zincate, zinc chromate and mixed metal oxides of two or more of manganese, nickel, titanium, chromium, antimony, magnesium, cobalt, iron or aluminium, Prussian blue, vermillion, ultramarine, zinc phosphate, zinc sulphide, molybdates and chromates of calcium and zinc, metal effect pigments such as aluminium flake, copper, and copper/zinc alloy, pearlescent flake such as lead carbonate and bismuth oxychloride, According to another embodiment, the particulate solid is an inorganic or organic solid. Examples of such solids include, but are not limited to, extenders and fillers such as ground and precipitated calcium carbonate, calcium sulphate, calcium oxide, calcium oxalate, calcium phosphate, calcium phosphonate, barium sulphate, barium carbonate, magnesium oxide, magnesium hydroxide, natural magnesium hydroxide or brucite, precipitated magnesium hydroxide, magnesium carbonate, dolomite, aluminium trihydroxide, aluminium hydroperoxide or boehmite, calcium and magnesium silicates, aluminosilicates including nanoclays, kaolin, montmorillonites including bentonites, hectorites and saponites, ball clays including natural, synthetic and expandable, mica, talc including muscovites, phlogopites, lepidolites and chlorites, chalk, synthetic and precipitated silica, fumed silica, metal fibres and powders, zinc, aluminium, glass fibres, refractory fibres, carbon black including single- and multi-walled carbon nanotubes, reinforcing and non-reinforcing carbon black, graphite, Buckminsterfullerenes, asphaltene, graphene, diamond, alumina, quartz, perlite, pegmatite, silica gel, wood flour, wood flake including soft and hard woods, saw dust, powdered paper/fibre, cellulosic fibres such as kenaf, hemp, sisal, flax, cotton, cotton linters, jute, ramie, rice husk or hulls, raffia, typha reed, coconut fibre, coir, oil palm fibre, kapok, banana leaf, caro, curaua, henequen leaf, harakeke leaf, abaca, sugar cane bagasse, straw, bamboo strips, wheat flour, MDF and the like, vermiculite, zeolites, hydrotalcites, fly ash from power plants, icinerated sewage sludge ash, pozzolanes, blast furnace slag, asbestos, chrysotile, anthophylite, crocidolite, wollastonite, attapulgite and the like, particulate ceramic materials such as alumina, zirconia, titania, ceria, silicon nitride, aluminium nitride, boron nitride, silicon carbide, boron carbide, mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g. barium ferrites; and metal particles, for instance metallic aluminium, iron, nickel, cobalt, copper, silver, gold, palladium, and platinum and alloys thereof.

In still another embodiment, the particulate solid may be a flame retardant, such as pentabromodiphenyl ether, octabromodiphenyl ether, decabromodiphenyl ether, hexabromocyclododecane, ammonium polyphosphate, melamine, melamine cyanurate or antimony oxide or borate, a biocide, an industrial microbial agent or an agrochemical active ingredient, such as a pesticide including a fungicide, insecticide, nematicide, herbicide, a safener, a plant growth regulator or a mixture thereof.

The above compositions may also contain other ingredients, for example resins (where these do not already constitute the organic medium), cross-linking agents, fluidizing agents, wetting agents, anti-sedimentation agents, plasticizers, surfactants, dispersants other than the compound of the present disclosure, humectants, anti-foamers, anti-cratering agents, rheology modifiers, heat stabilizers, light stabilizers, UV absorbers, antioxidants, leveling agents, gloss modifiers, preservatives and mixtures thereof.

The concentration of the dispersant in any of the above compositions may be between about 0.001% by weight to about 100% by weight, based on the dry particulate solid weight. In another embodiment, the concentration of the dispersant in the compositions above may be between about 0.01% by weight to about 90% by weight, or between about 0.05% by weight to about 75% by weight, or between about 0.1% by weight to about 60% by weight, or between about 0.5% by weight to about 50% by weight, based on the dry particulate solid weight According to another embodiment, the dispersant is present in the compositions above in an amount of between about 0.75% by weight to about 30% by weight, based on the dry particulate solid weight. According to yet another aspect, the dispersant is present in the compositions above in an amount of between about 1% by weight to about 15% by weight, based on the dry particulate solid weight.

The present disclosure will now be further described with reference to the following non-limiting examples.

EXAMPLES

Example 1. Preparation of Inventive Dispersants 69.9 grams (0.035 moles, 0.035 equivalents) of a polyoxyalkylene monoamine (JEFFFAMINE® L-200 amine) was heated to 50° C. and added to a dry 250 ml vessel. 5.0 grams (0.017 moles, 0.35 equivalents) of a polyisocyanate compound comprising a uretidione group (Isonate® 143 L polyisocyanate) was then added slowly to the vessel over a period of time (approx. 1 minute), with mixing. After all of the polyisocyanate compound had been added, the vessel was covered and the reaction mixture was mixed for an additional 30 seconds. The vessel was then placed in an oven at a temperature of 60° C. for a period of time (14 hours).

Other polyoxyalkylene monoamines and isocyanate compounds were reacted as described above to form additional inventive dispersants. Table 1 shows the combinations of such monoamines and isocyanate compounds and the proportions of amine to isocyanate equivalents for each dispersant. Reactions were verified by the determination of the amine value and isocyanate content for the dispersants by IR spectroscopy. As shown below, each dispersant that was produced contained no residual isocyanate content.

TABLE 1

| | Actuals | | | | | Isocyanate | | | | | | | Equivalent |
|---|---|---|---|---|---|---|---|---|---|---|---|---|---|
| | SURFONAMINE | | | | | ISONATE | RUSINATE | RUBINATE | RUBINATE | RUBINATE | | Total | Ratio |
| Run | L100 | L200 | L207 | L300 | meq | 143L | 1680 | 44 | M | 9433 | meq | Mass | N/NCO |
| A | | 147.28 | | | 75.1 | 10.86 | | | | | 75.2 | 158.1 | 0.999 |
| B | | 147.01 | | | 75.0 | | 10.80 | | | | 75.5 | 157.8 | 0.992 |
| C | | 147.06 | | | 75.0 | | 10.19 | | | | 71.3 | 157.3 | 1.052 |
| D | | 147.00 | | | 75.0 | | 11.28 | | | | 78.9 | 158.3 | 0.950 |
| E | 145.60 | | | | 150.0 | | 21.47 | | | | 150.2 | 167.1 | 0.998 |
| F | | | 147.05 | | 75.0 | | 10.72 | | | | 75.0 | 157.8 | 1.000 |
| G | | | | 157.90 | 60.0 | | 8.60 | | | | 60.2 | 166.5 | 0.997 |
| H | | 147.03 | | | 75.0 | | | 9.30 | | | 74.4 | 156.3 | 1.008 |
| J | | 147.03 | | | 75.0 | | | | 10.20 | | 75.2 | 157.2 | 0.996 |
| K | | 147.03 | | | 75.0 | | | | | 9.92 | 75.1 | 157.0 | 0.999 |

TABLE 2

| | | | | Dispersant | |
|---|---|---|---|---|---|
| Sample | SURFONAMINE Polyetheramine | Isocyanate | Ratio N/NCO | Amine Value, meq/g | Isocyanate Content by IR |
| A | L200 | ISONATE 143L | 1.00 | 0.007 | ND |
| B | L200 | RUBINATE 1680 | 0.99 | 0.003 | ND |
| C | L200 | RUBINATE 1680 | 1.05 | 0.008 | ND |
| D | L200 | RUBINATE 1680 | 0.95 | 0.002 | ND |
| E | L100 | RUBINATE 1680 | 1.00 | 0.023 | ND |
| F | L207 | RUBINATE 1680 | 1.00 | 0.005 | ND |
| G | L300 | RUBINATE 1680 | 1.00 | 0.002 | ND |
| H | L200 | RUBINATE 44 | 1.01 | 0.002 | ND |
| J | L200 | RUBINATE M | 1.00 | 0.002 | ND |
| K | L200 | RUBINATE 9433 | 1.00 | 0.001 | ND |

Example 2. Use of the Dispersants

A. Preparation of an Aqueous Medium/Dispersant

An amount of each dispersant above was dissolved in in equal amount of water to form a 50% by weight/50% by weight composition.

B. Preparation of a Colorant

A blend of a pigment, 20% by weight, the aqueous medium/dispersant of A, 5% by weight (or 1:10, active dispersant pigment) and additional water, 75% by weight, were premixed together for 30 seconds at 3000 rpm using a speed mixer (FlackTek Speed Mixer). 40 grams of this mixture was then mixed with 10 grams of 2 mm glass beads and grinded at 3000 rpm for 3 minutes. The beads were then separated from the colorant.

C. Preparing a Color Acceptance Paint.

A white base paint (PPG Olympic One Interior Semi-gloss Enamel (Base 1-356824)) was mixed with 1% of the blend made in A at 3000 rpm for 3 minutes using the speed mixer above.

D. Testing Drawdown Films

The color acceptance paint of C and the colorant of B were mixed together at 3000 rpm for 3 minutes using the speed mixer described above to form a composition containing 97% by weight of the color acceptance paint of C and 3% by weight of the colorant of B. Drawdown films were then made using a 4 mm drawdown bar. The films were allowed to dry overnight and the gloss and tinting strength for each were analyzed using a color spectrophotometer. The pure base paint (without any dispersant) was used as a control. The results for these dispersants combined with four different pigments, Sunfast® Green 7(PG7) from SUN Chemical, Clariant Hostaperm Violet BL 01(PV23), BASF Heliogen Blue L7101F (PB15:4), and Quindo Magenta 122 from SUN Chemical (PR122), are shown below in Table 3.

TABLE 3

| | PG7 | | PV23 | | PB15:4 | | PR122 | |
|---|---|---|---|---|---|---|---|---|
| DISPERSANT | Tint | Gloss | Tint | Gloss | Tint | Gloss | Tint | Gloss |
| Control | 100 | 58.1 | 100 | 52.3 | 100 | 56.2 | 100 | 59.1 |
| A | 104.07 | 58.5 | 103.05 | 52.7 | 112.72 | 58.3 | 109.49 | 60.3 |
| B | 104.97 | 58.6 | 103.22 | 51.4 | 112.93 | 58.4 | 108.23 | 60.8 |
| C | 103.27 | 60.4 | 103.82 | 50.6 | 118.13 | 58.9 | 106.79 | 59.4 |
| D | 104.13 | 61.9 | 103.36 | 51.5 | 112.73 | 58.7 | 109.59 | 59.4 |
| E | 101.64 | 60.4 | 107.47 | 56.8 | 114.87 | 61.5 | 115.61 | 62.4 |
| F | 103.82 | 59 | 105.52 | 54.7 | 116.7 | 59.7 | 114.33 | 61.7 |
| G | 103.65 | 58.2 | 105.94 | 57.8 | 112.36 | 60 | 110.45 | 60.4 |
| H | 101.95 | 58.4 | 99.65 | 51.4 | 109.18 | 57.7 | 109.45 | 59.4 |
| J | 100.22 | 59.2 | 100.37 | 52.3 | 109.54 | 58.4 | 108.47 | 60.9 |
| K | 103.01 | 58 | 103.4 | 51.6 | 114.73 | 56.3 | 108.41 | 60 |

From the results above, one can clearly see the superior performance properties with respect to tinting and gloss for the drawdown down films containing the dispersants of the present disclosure.

Although making and using various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

What is claimed is:

1. A dispersant substantially free of biuret groups obtained from the reaction of: (i) a liquid isocyanate compound substantially free of an isocyanate prepolymer, wherein the liquid isocyanate compound is a polyisocyanate compound comprising a functional group selected from the group consisting of, an iminooxadiazine, a uretdione, an allophant and combinations thereof; and (ii) a polyoxyalkylene monoamine wherein the ratio of the number of amino groups from the polyoxyalkylene monoamine to the number of isocyanate groups from the liquid isocyanate compound is within the range of 0.95 to 1.2.

2. The dispersant of claim 1, wherein the functional group is a uretdione group.

3. The dispersant of claim 1, wherein the polyoxyalkylene monoamine is a compound having a formula

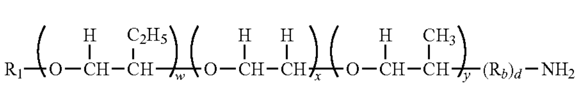

where $R_1$ is hydrogen, a $C_1$ to $C_{20}$ alkyl group or a $C_6$ aryl group optionally substituted with one or more $C_1$ to $C_{10}$ alkyl groups; w, x, and y are each independently an integer from zero to about 100, subject to the proviso that w+x+y is greater than two; d is 0 or 1; and, $R_b$ is a $C_1$ to $C_{10}$ alkyl group.

4. The dispersant of claim 1, wherein the polyoxyalkylene monoamine has a formula

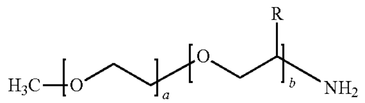

where R is methyl and a and b are integers such that the mole ratio of PO/EO in the monoamine ranges from about 9/1 to about 1/11.

5. A composition comprising the dispersant of claim 1, a particulate solid and one of an organic medium or and aqueous medium.

6. The composition of claim 5, wherein the organic medium is present and is a polar organic medium.

7. The composition of claim 5, wherein the organic medium is present and is a non-polar organic medium.

8. The composition of claim 5, wherein the particulate solid is a pigment.

9. The composition of claim 5, wherein the composition further comprises a binder.

10. The composition according to claim 5, wherein a coating is disposed on the particulate solid.

11. The composition according to claim 5, wherein the composition comprises the aqueous medium.

12. The composition of claim 11, wherein the particulate solid is a pigment.

13. A method of forming a dispersant according to claim 1 comprising contacting the liquid isocyanate compound and the polyoxyalkylene momoamine and allowing the liquid isocyanate compound and the polyoxyalkylene monoamine to react and form the dispersant.

14. The method of claim 13, wherein the reaction is conducted at ambient temperature and/or in the absence of a catalyst.

15. The method according to claim 13, further comprising dispersing a particulate solid in an aqueous or organic medium comprising an effective amount of the dispersant and contacting the particulate solid with the dispersant.

* * * * *